United States Patent [19]
Riach et al.

[11] Patent Number: 5,121,074
[45] Date of Patent: Jun. 9, 1992

[54] POWER AMPLIFIER

[75] Inventors: James C. Riach, Willowdale; Paul Hrivnak, Toronto, both of Canada

[73] Assignee: Vectronics Corporation, Scarborough, Canada

[21] Appl. No.: 533,843

[22] Filed: Jun. 9, 1990

[51] Int. Cl.⁵ ............................................. G01R 19/00
[52] U.S. Cl. ...................................... 330/2; 116/300; 116/334
[58] Field of Search ..................... 330/2; 324/114, 115; 455/115, 120; 116/300, 332, 333, 334

[56] References Cited
U.S. PATENT DOCUMENTS 4,332,162  6/1982  Garthe .......................... 116/300 X

OTHER PUBLICATIONS

Pagel, Paul K., "Heath SB-1000 HF Linear Amp", *QST*, Feb. 1988, pp. 33-35.
Diawa Ham Accessories ad, *QST*, Sep. 1984, p. 97.

Primary Examiner—Steven Mottola

[57] ABSTRACT

The present invention relates to a tuning aid system for manually operated vacuum tube type RF power amplifiers. The tuning sequence is simplified by providing a visual indication of a region where the plate current and grid current of the vacuum tube indicate that the amplifier is properly tuned. In particular, the plate current and grid current of the vacuum tube are monitored and the readings thereof are coordinated by means of a visual display which indicates when the amplifier is properly tuned. In an aspect of the invention, the visual display also includes directions for modifying the level of the plate current and/or grid current on either side of the tuned region.

10 Claims, 3 Drawing Sheets

POWER AMPLIFIER

FIELD OF THE INVENTION

The present invention relates to a tuning aid for manually operated vacuum tube type power amplifiers. In particular, the invention relates to a tuning aid system which simplifies the coordination of the plate current and grid current of the vacuum tube amplifier, as required, to tune the amplifier.

BACKGROUND OF THE INVENTION

Vacuum tube type power amplifiers are used in RF systems and require that both the plate current and grid current be monitored during tune-up sequences and dynamic operation. This information is required by regulatory agencies in both the United States and Canada and imposed upon manufacturers to ensure that power input restrictions outlined by the licensing bodies are adhered to by the operators of the equipment. It is also necessary to have provisions on equipment to monitor the power supply plate voltage. This gives the inspection and licensing bodies some means by which they can calculate the input power by multiplying the input plate current by the input plate voltage to arrive at the input power.

For vacuum tube type RF power amplifiers, the tuning process can be long and tedious. Specifically referring to manually tuned RF power amplifiers, the amplifier is driven by an RF exciter, and both plate current and grid current are simultaneously monitored by two separate meters. As the drive power from the exciter is applied to the amplifier, the plate and the grid currents will rise. The plate current will be required to indicate circuit resonance by displaying a "dipped" plate current value. This value of plate current is unique to the type of power tube in use in the amplifier. At the same time, while power is externally applied to the amplifier, grid current will begin to flow and this will be monitored by a second meter. For maximum power output from the amplifier, there will be a point where a value of plate and grid currents represent the maximum power output in watts, optimum linearity and lowest distortion. These values must be known intimately by the operator in order to avoid overloading or underloading the amplifier when implementing the tune-up procedure.

In order to accomplish this in the past, each of the plate current and grid current have been monitored and the plate and grid currents are known which represent a tuned amplifier. The operator adjusts the load control on the amplifier, which varies both the plate and grid current, and retunes until such time the proper values are achieved. Often this requires adjusting the exciter, as a particular pair of values is tied to the exciting signal.

In addition to the regulatory requirements, it is also desirable to properly tune the amplifier, as operating outside the tuned range shortens the life of the vacuum tube and can lead to distortion which can cause interference in adjacent channels. Therefore, it is highly desirable to be tuned to the proper currents for both the life the amplifier and for the quality of the signal.

SUMMARY OF THE INVENTION

According to the present invention, a vacuum tube type power amplifier is improved by including means for monitoring of each of the plate current and the grid current and coordinating the readings thereof by means of a visual display indicating whether the amplifier is tuned. Vacuum tube type power amplifiers require tuning to operate in a particular manner and this tuning is accomplished by monitoring and adjusting both the plate current and grid current of the vacuum tube. The improved amplifier with the visual display indicating whether the amplifier is tuned simplifies the operation for the user and ensures that he will operate at the proper level, rather than operate the amplifier outside of its designed range.

The present invention is also directed to a method of tuning a vacuum tube type RF power amplifier externally driven by an RF exciter. This method comprises the steps of simultaneously monitoring the plate and grid current of the vacuum tube type amplifier and displaying the results of the monitored plate and grid current on separate needle meters having a common crossover range which includes the paired points of grid and plate current where the amplifier is tuned, identifying within the common crossover range an area of grid and plate current where the desired power output, desired linearity and low distortion is achieved due to the amplifier being tuned, and adjusting the plate current and/or grid current such that the cross point between the needles of the two meters is within the tuned region.

In a preferred form of the vacuum tube type amplifier, the amplifier includes a dual meter having two needles positioned to have an overlapping output region which includes the various points where the amplifier is tuned, with this dual meter having a marked tuned region on the face of the meter where the cross point of the two needles within this region provides the visual indication that the amplifier is tuned.

In tuning of vacuum tube type power amplifiers, you have to tune to the frequency of the exciter as well as adjust the load of the amplifier. Typically, the step is to adjust the tune control until the required "dip" of the plate current is achieved and thereafter monitor both the plate current and grid current while varying the load control of the amplifier until both the plate current and grid current are at values where the crossover point of the needles is within the tuned region.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
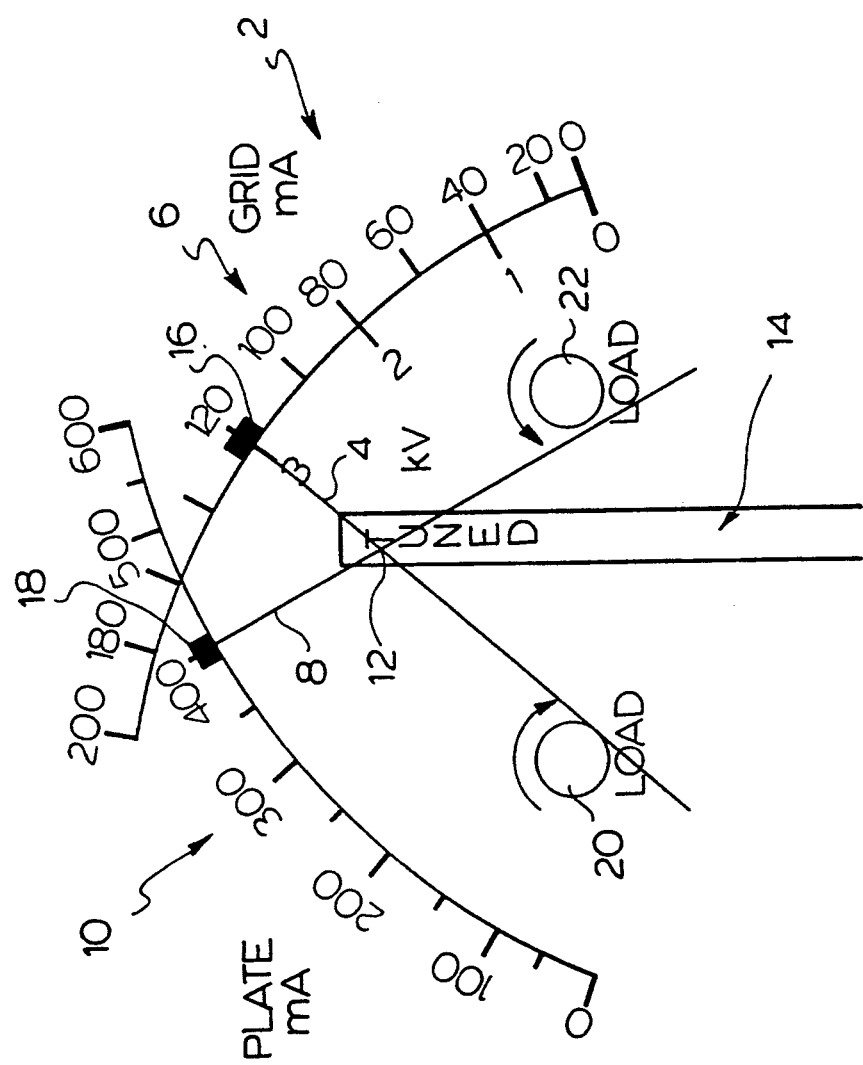
FIG. 1 is a view of the face plate of the dual meter used to monitor plate current and grid current.

The dual meter, indicated as 2, is used to display both the grid current and the plate current of the vacuum tube type amplifier. The meter includes a grid current needle 4 associated with the grid current scale 6 and a plate current needle 8 associated with the plate current scale 10. The needles 4 and 8 have a crossover point 12 which varies in position in accordance with the respective values of plate current and grid current.

Associated with the crossover point 12 is a tuned region, in this case, a vertical bar type region indicated as 14. This tuned region represents all the various pairs of plate current and grid current where the amplifier is tuned. The crossover points of these pairs of grid current and plate current actually is a slightly curved line which is generally vertical, however, the tuned region 14 gives some variance about the actual plate and grid currents and is acceptable for tuning of the amplifier.

Typically, with a vacuum tube type amplifier, the tube manufacturer specifies values of the plate current and grid current where the amplifier is tuned. In this specific case, the specified points are 400 mA with respect to the plate current and 120 mA with respect to the grid current. At these values of the plate current and grid current, the crossover point 12 of the needles is generally centered on the letter "T" of the word "Tuned" within the tuned region 14.

As indicated in FIG. 1, optimum loading has been achieved as the crossover point 12 of the needles is located within the tuned region 14.

Figure 2:
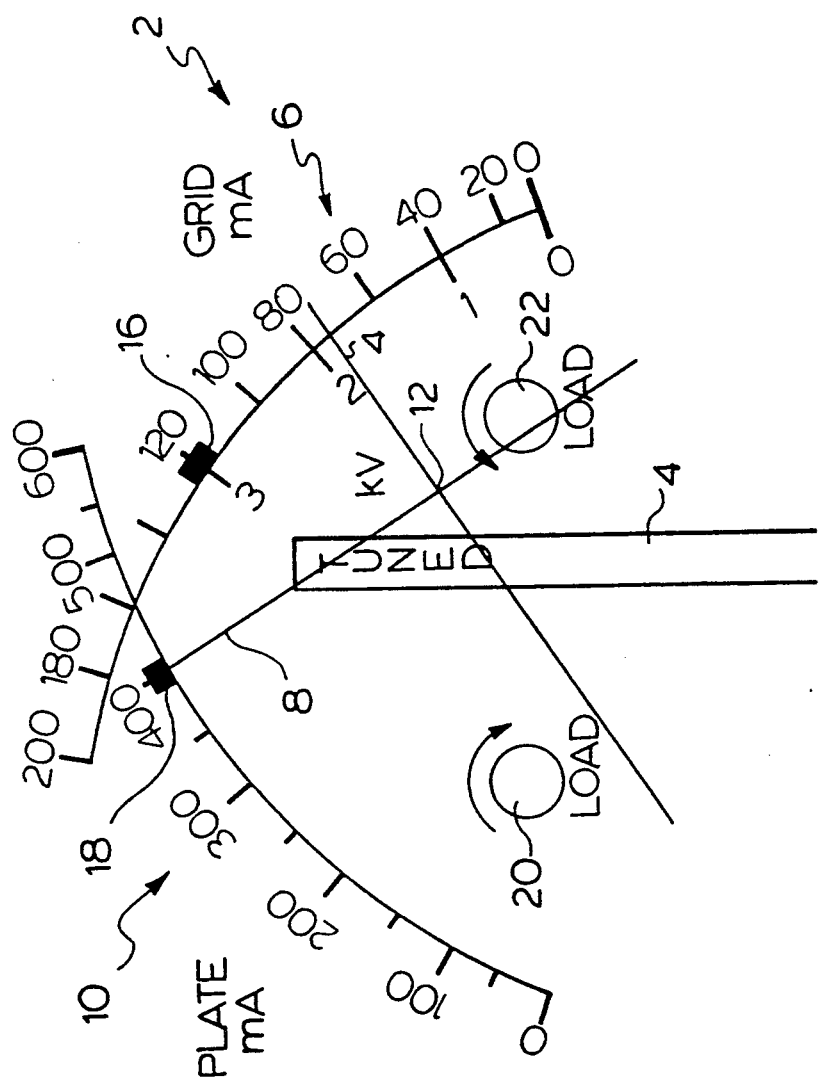
FIG. 2 is a view of the face plate of the dual meter where the values of the plate current and grid current are outside of the tuned region.

In FIG. 2, the plate current is at 400 mA, however, the grid current is only at about 75 mA and thus, the crossover point 12 is to the right of the tuned region 14. Control adjustment indicator 22, also located to the right of the tuned region and fixed on the meter face, provides a visual indication of the direction of load adjustment of the amplifier to adjust both the plate and grid current to achieve a tuned amplifier. Thus, if the load control is adjusted by rotation in a counterclockwise direction, as indicated by 22, the crossover point 12 will move towards the tuned region. By properly adjusting the amount of variance of the load in this direction, one can achieve the placement of the crossover point 12 within the tuned region 14. In FIG. 2, not enough drive is provided to the amplifier and in fact, the loading of the amplifier has been overcompensated.

Figure 3:
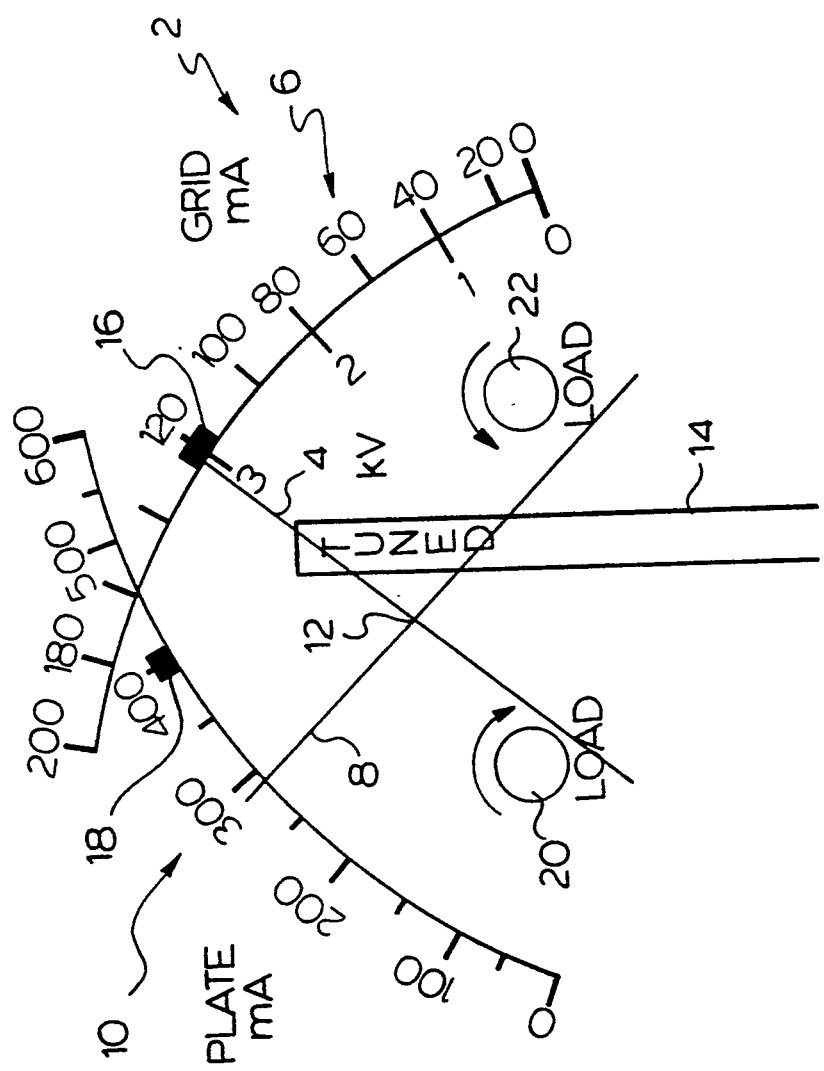
FIG. 3 is a further view of the face plate with the plate current and grid current located to the opposite side of the tuned region or underloaded.

In FIG. 3, the amplifier is underloaded, as the crossover point 12 is now to the left of the tuned region 14. Adjustment of the load control of the amplifier in a clockwise direction, as indicated by control adjustment indicator 20, also located to the left of the tuned region, will adjust the plate current and grid current such that the crossover point 12 of the needles moves towards the tuned region 14. Thus, the control adjustment indication 20 provided on the face of the meter 2 allows the operator a simple means for adjusting the load of the amplifier to achieve proper tuning.

The present invention saves time and improves the accuracy of the tune-up procedure for vacuum tube type RF power amplification devices. This simplification is a result of the cross-needle metering and the display of plate current and grid current on one meter. Both plate and grid current values are plotted as the amplifier is driven by an external source to the point where maximum power is reached. These plotted points form a slightly curved vertical line matching all the points where the plate current needle and the grid current needles cross. These points have been used to define the vertical rectangular tuned bar region 14 which appears on the face of the meter. As the amplifier is loaded therefore after the plate current is "dipped" (corresponding to the resonant point), and thereafter the loading control is simply adjusted so that the needles cross inside the tuned bar region 14 on the meter face. If the needles cross either on the left or the right side of the tuned bar region 14 indicated on the meter face, the operator need only rotate the loading control on the amplifier as indicated to move the cross-needles into the calibrated zone of the tuned region 14. This tuning system functions in both steady state or dynamic condition applications of the RF power amplifier.

By properly tuning the vacuum tube type RF power amplifier as discussed above, the life of the amplifier will increase as well as the ability for the user to properly operate his equipment in its intended manner and within the predetermined operating range. The coordination of the plate and grid current has been simplified and the end user merely has to locate the crossover point 12 within the indicated tuned bar region 14.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In a vacuum tube type RF power amplifier requiring tuning to operate in a particular manner and wherein said tuning is accomplished by monitoring and adjusting both the plate current and the grid current of the vacuum tube, the improvement comprising a dual motor for monitoring of each of the plate current and the grid current and coordinating the readings thereof by means of a visual display indicating whether the amplifier is tuned, said dual meter comprising two needles positioned to have an overlapping output region which includes the various points where the amplifier is tuned and marking a tuned region on a face of said dual meter where the cross point of the needles within this region provides the visual indication that the amplifier is tuned.

2. In a vacuum tube type power amplifier as claimed in claim 1 wherein said tuned region is a narrow band area.

3. In a vacuum tube type power amplifier as claimed in claim 2 wherein said narrow band area is a rectangular region.

4. In a vacuum tube type power amplifier as claimed in claim 1 wherein said dual meter provides guidance for adjusting said amplifier when the cross point of said needles is outside of said tuned region.

5. In a vacuum tube type power amplifier as claimed in claim 4 wherein said guidance is a visual indication of an adjustment of one of said plate current or grid current.

6. In a vacuum tube type power amplifier as claimed in claim 1 wherein the tuned region provides an acceptable variance about the precisely tuned values of grid and plate current.

7. In a vacuum tube type power amplifier as claimed in claim 3 wherein said tuned region is located between needle pivot points of the respective meters.

8. A method of tuning a vacuum tube type RF power amplifier externally driven by an RF exciter comprising the steps of:
   a) simultaneously monitoring the plate and grid currents of the vacuum tube type amplifier and displaying the results of the monitored plate and grid currents on needle meters having a common crossover range which includes paired points of grid and plate current where the amplifier is tuned,
   b) identifying a tuned region within the common crossover range comprising an area of grid currents and plate currents where the desired power output, desired linearity and low distortion is achieved due to the amplifier being tuned and indicated by the crossover point of said needles being located in the tuned region, and c) adjusting the plate current and/or grid current such that the cross point between the needles of the two meters is within the tuned region.

9. A method of tuning a vacuum tube type RF power amplifier externally driven by an RF exciter as claimed in claim 8 including providing instructions to one side of said tuned region to move the needle crossover point towards said tuned region.

10. A method of tuning a vacuum tube type RF power amplifier externally driven by an RF exciter as claimed in claim 9 wherein the step of providing said instructions includes marking directly on the face of the meters to each side of the tuned region a visual display of the corrective action necessary for tuning of the amplifier.

* * * * *